US007723665B2

(12) United States Patent
Bjerkestrand

(10) Patent No.: US 7,723,665 B2
(45) Date of Patent: May 25, 2010

(54) METHOD FOR CALIBRATION IN TRANSFERENCE OF MOTION PICTURES TO A PHOTOSENSITIVE MATERIAL

(76) Inventor: Rune Bjerkestrand, Gamle Kongevei 135, N-3040 Drammen (NO)

( * ) Notice: Subject to any disclaimer, the term of this patent is extended or adjusted under 35 U.S.C. 154(b) by 70 days.

(21) Appl. No.: 11/662,141

(22) PCT Filed: Sep. 9, 2005

(86) PCT No.: PCT/NO2005/000333

§ 371 (c)(1),
(2), (4) Date: Oct. 11, 2007

(87) PCT Pub. No.: WO2006/028386

PCT Pub. Date: Mar. 16, 2006

(65) Prior Publication Data

US 2008/0193123 A1    Aug. 14, 2008

(30) Foreign Application Priority Data

Sep. 10, 2004    (NO) .............................. 20043812

(51) Int. Cl.
*G01J 1/42* (2006.01)
(52) U.S. Cl. .................................. 250/208.6; 250/205
(58) Field of Classification Search .............. 250/208.6, 250/205
See application file for complete search history.

(56) References Cited

U.S. PATENT DOCUMENTS 5,369,433 A    11/1994   Baldwin
6,057,537 A *  5/2000   Schubert et al. ............. 250/205

FOREIGN PATENT DOCUMENTS

| EP | 1 033 873 A2 | 9/2000 |
| EP | 1 052 538 A1 | 11/2000 |
| GB | 2 005 512 A | 4/1979 |
| WO | WO 03/096685 A1 | 11/2003 |

\* cited by examiner

*Primary Examiner*—Seung C Sohn
(74) *Attorney, Agent, or Firm*—Finnegan, Henderson, Farabow, Garrett & Dunner, L.L.P.

(57) ABSTRACT

A method for calibration and/or compensation in transference of digital and/or analogue motion pictures to a photosensitive material comprises exposing a section of a photosensitive material by modulating light from a light source and imaging the modulated light onto the photosensitive material, develop the section of the photosensitive material, measure the characteristics of the developed film while illuminated by the said light source, and adjusting the light source and/or light modulation according to the measurement. By using the same light source for exposing and measuring the film, good reproducibility can be achieved, as well as a reliable basis for the adjustments.

6 Claims, 4 Drawing Sheets

METHOD FOR CALIBRATION IN TRANSFERENCE OF MOTION PICTURES TO A PHOTOSENSITIVE MATERIAL

BACKGROUND OF THE INVENTION

The invention relates to a method and device for calibrating the process of a photographic printing apparatus for copying cinematographic film by projection.

Traditionally two different technologies are used to transform motion pictures from digital format to analogue format:
CRT (Cathode Ray Tube)
Laser Motion pictures are composed of a number of picture frames shown one at a time to give the impression of movements. When recording the motion pictures, that is printing on film, one can divide the frames in the original motion picture into lines and write the frame on the film line by line.

In general we can say that both prior art technologies transfer frames in the motion picture to a celluloid film line by line as opposed to the inventive technology that prints on the celluloid film a full frame on each exposure.

CRT Technology

The Cathode Ray Tube (CRT) technique utilises a powerful high resolution picture tube to project film-exposing light in a 3-pass process through a rotating RGB (red, green, blue) colour wheel, or 3 separate picture tubes with separate R, G and B colour filters. It uses three tubes for displaying each of the three basic colours, red, green, and blue. The CRT technique writes one frame at a time and each frame is recorded point by point, line-by-line. There are few moving parts in a CRT machine, and hence relatively little maintenance.

This technique is robust and well known. However, it has several deficiencies. CRT exhibits a restricted contrast range, pronounced grain structure, blooming flare, insufficient colour fidelity and it requires long exposure times. The reason for many of these quality deficiencies can be found in the low light output of Cathode Ray Tubes, the light source used in CRT recorders. To compensate this, a variety of methods are used: a higher speed (=grainier) film is utilised, a lower density range is chosen, brighter, wide-band colour filters are employed which result in insufficient colour separation and low speed recording (15-30 seconds per frame).

Laser Technology

Laser is a complex and very expensive technology. High intensity laser light is reflected off spinning mirrors to expose the film. Laser recorders have heavy maintenance and are prone to very high costs. It is considered to give higher quality output than the CRT at the speed of approximately 5 to 10 seconds per frame. Like the CRT, laser writes each frame line-by-line.

The laser-recorder is dependent on a host computer to process image data and transfer it one line at a time to a line buffer in the recorder. The data in the line buffer is then routed through a digital to analogue converter (DAC) to the input of the acousto-optical modulators (AOMs) which modulate the image data onto the laser beams. Before reaching the AOMs, the light of each laser is adjusted to the required intensity by an attenuator. This is supposed to adjust for variations in film stock sensitivity and compensate for variations in laser energy output. Inside the AOM the laser beam passes through a crystal, and the internal grid structure of the crystal deflects the laser beam. By exiting the crystal with a high frequency wave, the crystal's grid structure, and thus the intensity of the laser beam, can be varied pixel by pixel. The three laser beams are then combined and exposed to the film by a rotating penta prism; one rotation exposes one line.

GB A 2005512 shows a process and apparatus for transcribing a colour videodisc onto a cinematographic film. A colour television signal representing a series of images is read on the video-disc, these images are reproduced on a television receiver, and the screen of this television receiver is filmed with a camera. This corresponds to an enhanced embodiment of the above described CRT recorder.

The greatest disadvantage of the prior art is time consumption. The laser units also have a limited lifetime and replacements are expensive. Hence, the actual recording cost will be higher with a laser recorder than with the device according to the invention. Besides, the laser and CRT recorders' shuttles have to move with extreme precision during the exposure, since any variance in velocity would lead to a variation of the distance between individual lines. This in turn will create a streaking artefact in the image.

U.S. Pat. No. 5,369,433 concerns an apparatus and method for recording a video signal on cinematographic film. A video signal is recorded on unexposed cinematographic film by shining light from a light source onto a deformable mirror device (DMD). The elements of the DMD are controlled in response to the video signal. Light is selectively reflected by the DMD onto an image plane containing the film such that the light reaching the film is representative of the video signal.

This publication deals with transferance of video signals to cinematographic film. In video format pictures are represented by two "half" pictures which in combination gives one picture. 50 such "half" pictures are shown per second, which in effect means that there are 25 whole pictures/sec to be transferred. In cinematographic film, 24 pictures are shown per second, and this difference in frequency must be compensated for. This publication shows use of different devices for transferring information contained in 25 pictures/second to cinematographic film. These devices are deinterlacing and integrating systems etc. The presence of such devices leads to an increase in the total costs and introduces possible error sources.

One problem with prior art is that there are variations in the quality of the unexposed film. This variation is mainly batch variations from the manufacturing of the film, and the variations will influence the final result of the film after exposing. Also variations in the development process for the film, e.g. change in the chemical properties/composition of the development chemicals, will influence the quality of the final film.

This problem is traditionally dealt with by sending sections of exposed and developed film to a laboratory for analysis, followed by adjusting the recording process according to the results of the analysis. This is a very time-consuming method, and the calibration is therefore performed more infrequently than desired.

The object of the present invention is to provide a method for calibration and/or compensation for variations in film stock and chemical changes in the development process in transference of digital and/or analogue motion pictures to a photosensitive material, where the calibration can be performed more frequent than with prior art.

The expression "frame by frame" used in this specification emphasises that the transference is done for each single frame in the source material. This "source material" can be a High definition TV (HDTV) picture sequence, a sequence of pictures scanned from a motion picture film/cinematographic film by means of a full frame digital scanner, a digitally created digital film (e.g. created on a computer), or any other digital full frame formate. With "full frame" in this context it is meant a picture comprising all lines (and pixels) in each frame. This is not the case for TV/video pictures, which consists of two "half" pictures which must be transferred and combined to create a complete picture. The solution related to TV pictures needs complicated interpolation and deinterlacing devices for compensating the difference in number of pictures by second, as mentioned above.

In other words one can say that by means of the invention, transference is achieved without dividing the frame into lines. Besides, the complete full frame of all frames are transferred, this makes deinterlacing and interpolation unnecessary.

A device for transferring full frame digital and/or analogue motion pictures comprising a series of frames, to a photosensitive material, comprises a light source, a colour filter, at least one lens for projecting modulated light onto the photosensitive material a shutter device and a transport device, the device further comprising:

a digital head comprising the light source, the colour filter, at least one full frame device for light modulation, the at least one lens, processing electronics and software for processing the input image data, and for transport and shutter device synchronisation,
 a user interface, and
 a graphical computer interface connected to the digital head, wherein the transport device is adapted for exposing, section for section, sections of the photosensitive material corresponding to each of the motion picture frames, to the modulated projected light, in such a way that the number of frames per time unit in the original motion picture corresponds to the number of projected frames per time unit.

In a further embodiment, the device comprises image sensors located adjacent to the photosensitive material for providing signals to the digital head concerning optical properties of the projected image, the digital head using the sensor signals in controlling the shutter device and the light modulation device.

In a further embodiment, the device for light modulation is a Digital Micromirror Device (DMD), a transmissive LCD or a reflective LCD device.

In a further embodiment the graphical computer interface is adapted for receiving the image data from an external computer.

In a further embodiment the image data has a digital and/or analogue format.

In a further embodiment, the device comprises only one device for light modulation, and this light modulation device is adapted for modulating the three primary colours, red, green, blue.

In a further embodiment the device comprises three devices for light modulation, which each is adapted for modulating one of the three primary colours, red, green, blue.

In a further embodiment the colour filter is a colour wheel divided in sections of different colours, preferably the three primary colours red, green, blue.

In a further embodiment the colour filter comprises separate colour filters of different colours.

In a further embodiment the digital motion picture and/or the analogue representation of that motion picture is either of negative or positive format.

A method for transferring full frame digital and/or analogue motion pictures, comprising a series of frames, to a photosensitive material, comprises, for each frame, the following steps:

a) receiving image data through a graphical computer interface to a digital head, b) processing the image data in the digital head, c) modulating light from a light source by means of a device for full frame light modulation according to the processed image data, d) projecting the modulated light onto one section of a photosensitive material, e) transferring the photosensitive material, by means of a transport device, to expose the next section, f) repeating steps d) and e) until the desired sections of the photosensitive material have been exposed to the projected modulated light.

A further embodiment of the method further comprises steps for sensing image properties with image sensors located adjacent to the photosensitive material, for providing signals to the digital head concerning optical properties of the projected image, the digital head using the sensor signals in controlling the shutter device and the light modulation device.

A further embodiment of the method further comprises that the image data has a digital and/or analogue format.

A further embodiment of the method further comprises that the processing of the image data includes converting analogue signals to digital format.

A further embodiment of the method further comprises that a full frame of the motion picture is projected onto the photosensitive material in step d).

A further embodiment of the method further comprises that the exposure of the photosensitive material is performed line by line with continuous transferring of the photosensitive material.

A further embodiment of the method further comprises that the number of frames exposed on the photosensitive material per time unit corresponds to the number of frames per time unit of the original digital and/or analogue motion picture film.

SUMMARY OF THE INVENTION

The method according to the invention for calibration and/or compensation in transference of digital and/or analogue motion pictures to a photosensitive material, comprises:
 exposing a section of a photosensitive material by modulating light from a light source and imaging the modulated light onto the photosensitive material,
 develop the section of the photosensitive material,
 measure the characteristics of the developed film while illuminated by the said light source, and
 adjust the light source and/or light modulation according to the measurement.

BRIEF DESCRIPTION OF THE DRAWINGS

The invention will now be described more in detail, by way of an example and with reference to the accompanying drawings.

DETAILED DESCRIPTION OF THE INVENTION

Figure 1:
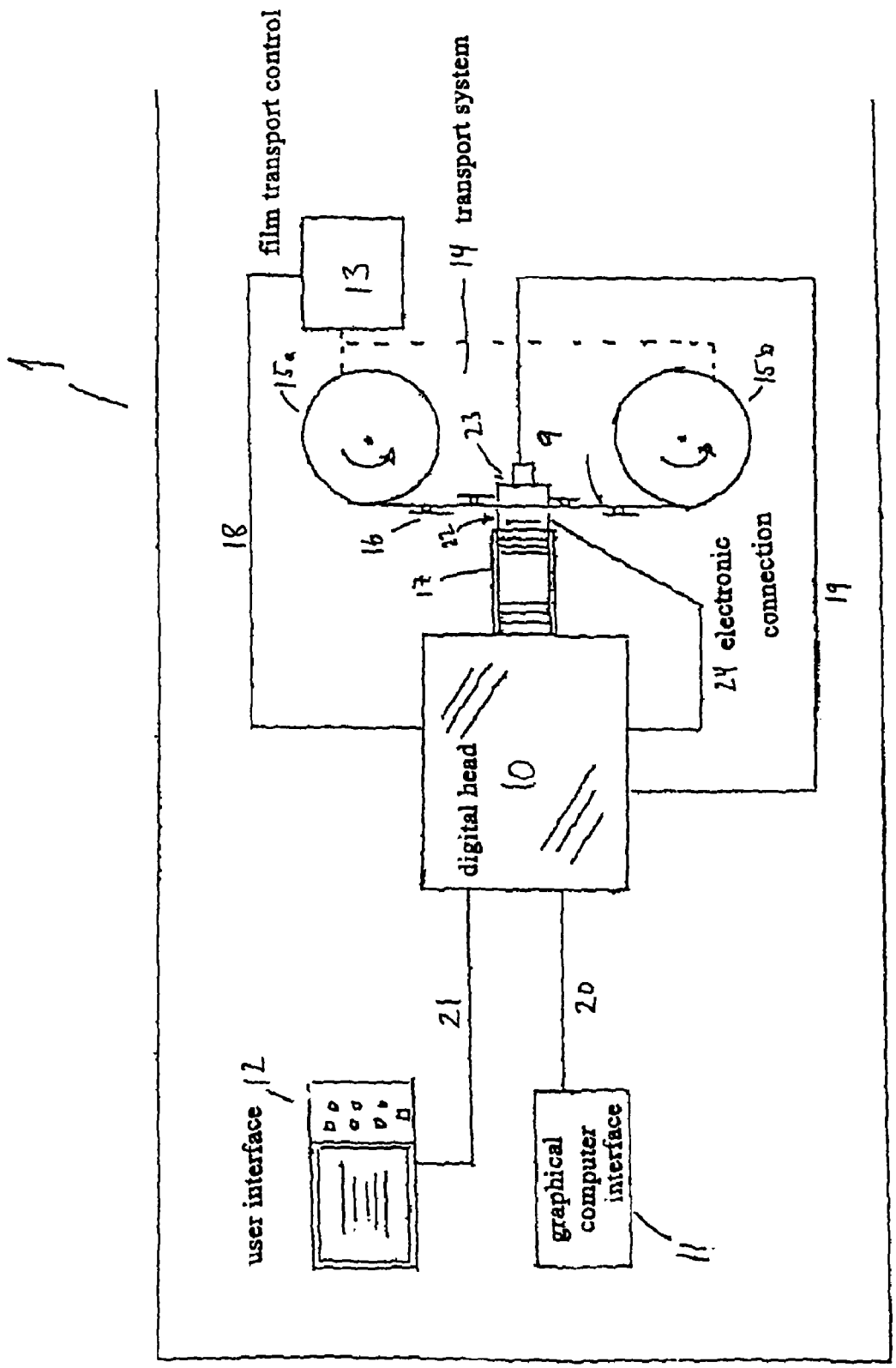
FIG. 1 is a schematic view of the device according to the present invention.

Using the same light source for exposing the film and the measurements after developing the exposed film, results in good reproducibility and more comparable measurements. Errors in the measurements, and thus in the calibration/adjustment of the light source or other parameters such as the light modulation, is thus reduced. Examples of adjustments that can be made to compensate for unwanted errors are colour balance, brightness, contrast, etc. The adjustments may be implemented by means of controlling the light source, by modifying the control signals to the light modulation device, by changing the shutter times, adjusting the transport speed of the film, or by adjusting any other variable in the process.

In one embodiment of the method according to the invention the exposing of the photosensitive material is performed by means of an exposing device which comprises a light source, a light modulation device, a transport device, and a processing device.

In another embodiment of the method, is the exposing of the photosensitive material performed by means of an exposing device which comprises a light source, a colour filter, at least one lens for projecting modulated light onto the photosensitive material a shutter device and a transport device, a digital head comprising the light source, the colour filter, at least one full frame device for light modulation, the at least one lens, processing electronics and software for processing the input image data, and for transport and shutter device synchronisation, a user interface, and a graphical computer interface connected to the digital head, wherein the transport device is adapted for exposing, section for section, sections of the photosensitive material corresponding to each of the motion picture frames, to the modulated projected light, in such a way that the number of frames per time unit in the original motion picture corresponds to the number of projected frames per time unit.

Other embodiments using other exposing devices which comprise all or some of the features in the device for transferring full frame digital and/or analogue motion pictures comprising a series of frames to a photosensitive material, which is described above and will be further described below.

The developed film may be inserted into the exposing device and the exposing device may comprise sensors for measuring the characteristics of the developed film.

As the same device may be employed both for exposing the film and for measuring the exposed (and developed) film, the measurements may be performed at any desired time. This means that the measurements and thus compensation/calibration may be performed every time a new film batch is used, the light source is exchanged, new chemicals are employed in the development process etc. This ensures a better overall performance of the system. In addition, using the same components for exposure and measurements give an excellent measurement reliability, as also described above with respect to the light source.

In a further embodiment of the method is the adjustment of the light source or the light modulation performed if the difference between the measured characteristics and the desired characteristics exceeds a threshold value.

The measurement from the sensors may also provide signals indicating status for the exposing device. Such signals may be generated in a processing device, and indicate overall status of the system at start up, status of the light source, estimated remaining lifetime for the light source, operational status for the light modulation device, etc.

The device for transferring full frame digital and/or analogue motion pictures comprising a series of frames, to a photosensitive material includes a digital head which comprises at least one light source, a colour filter, a light modulation device and a projecting lens, a shutter device, a film transportation device, and a combined control system partly comprised in the digital head, comprising user interface, transport- and shutter synchronisation, image calibrating system and "graphical computer interface". The components are preferably fixed on a mechanical structure and are enclosed in a housing.

The photosensitive material on which to project the motion pictures, may be for example a celluloid film, photosensitive paper, or any other photosensitive material suited for carrying a representation of a motion picture film. In a preferred embodiment the photosensitive material is adapted for displaying motion pictures. Both the original motion picture to be transferred and the projection may either be positive or negative.

The light source emits light into the optical path of the digital head. Between the light source and the light modulation device in the light path, is a colour filter. This may be a rotating colour wheel, divided in sections of different colours, which passes light of the different colours sequentially (in series). The colours of the colour wheel will preferably be the three primary colours, red, green, and blue. Alternatively may the light pass through separate colour filters of different colours, for being transmitted to separate colour modulation devices, respectively. The latter gives the best optical performance, since all the colours are transmitted continuously in parallel.

The light modulating device for modulation of the light from the light source may e.g. be a DMD (digital micromirror device), as part of a DLP device (digital light processing), a transmissive LCD device or a reflective LCD device. The light modulating device must be a digital full frame device (i.e. able to display all picture lines simultaneously). The light modulating device may be of a type which modulates all three primary colours (red, green, blue, (RGB)) or the device may comprise three light modulating units, each able to modulate one of the three primary colours.

The digital head comprises also processing electronics and software for processing input image data. The input image data may have any kind of displayable image format, digital or analogue, such as computer graphics format etc. Preferably the source material is HDTV or other full frame digitally represented film. The picture representation may be either a positive or a negative representation. The processing electronics and software may be adapted for processing both digital and analogue data, and comprises e.g. AD-converters for converting an analogue signal to a digital signal for further processing. The processing electronics/software further controls the light-modulating device according to known protocols/standards to give the correct modulation of light to be projected onto the photosensitive material. The processing of the input image data preserves the representation of a motion picture in such a way that the number of frames per time unit in the original motion picture corresponds to the number of projected frames per time unit. This provides a very efficient transferrance of the film, as there is no need for complicated interpolation procedures. The projected pictures may be either positive or negative according to the desired use of the product.

At least one projecting lens with fixed or variable focal length for resizing the motion picture full frame to fit the photosensitive material, e.g. celluloid film is located in the light path after the light modulation device(s). The variable focal length is achieved through combination of lenses where the positions of the lenses may be varied manually or automatically.

The light from the light source follows a light path through the colour filter, reflects off or is transmitted through the light modulation device, and is focused on the photosensitive material by the projecting lens(es).

As mentioned earlier, the image data are received by the digital head through the graphical computer interface connected to the digital head. The graphical computer interface comprises a processor and data transfer lines, and advantageously a monitor device. The monitor device may be adapted to display the image frame data that are input to the digital head. The graphical computer interface may be adapted for connection to external equipment for transferral of and/or to display image data. The motion pictures that are transferred to the digital head may have a digital or an analog representation, and the graphical computer interface is adapted for receiving and/or transferring both analogue and digital data.

A graphic user interface may additionally be connected to the digital head, to receive and display information relating to the progress of exposing images on the photosensitive material. This information may include calibration references, motion picture film references (e.g. film name, duration, format etc.), film length used, measured picture quality, estimated time left, alarms in case of broken film, etc.

The photosensitive material is located in a film transportation device. The film transportation device comprises rollers arranged with a distance to each other. The rollers form two magazines which stops light transmitting through to the photosensitive material, one supply magazine for unexposed, and a second storage magazine for exposed photosensitive material, e.g. film. Their storage capacities may be e.g. 305, 610 or 1220 meters. The photosensitive material is transferred from one roller to the other, and thus defines a plane which coincides with a plane through the focal point/projection point. The transportation device further comprises film guide locks for securing the photosensitive material in the right position, film gate, film aperture gate to allow the light to expose the photosensitive material, and film channel which represents the path of the photosensitive material. Control signals for the film transportation device are generated in the digital head.

In front of the aperture gate, a shutter is located. The shutter may be of a mechanical type or alternatively e.g. an LCD-shutter. Control electronics in the digital head may control the operation of the shutter. Alternatively may the shutter be controlled by the transportation device. When the shutter is closed, no light transmits to the photosensitive material, but when the shutter opens, the light transmits to the photosensitive material and the image is recorded. As an alternative to a shutter, the amount of light transmitted from the light source may be controlled by controlling the light generated at the source. The time required for the shutter to be opened, may be determined by control electronics in the digital head based on information received from at least one image sensor placed adjacent to the photosensitive material, regarding the image quality. The image sensors may sense the brightness, colour saturation, contrast etc. The sensor values corresponding to each of these quality factors is compared in the digital head with pre-stored calibration values, and based on the differences of the values, the corrected exposure time is chosen from a table.

The above-mentioned sensor values are additionally the basis for the control signals from the digital head to the light modulating device(s). If the detected values for e.g. colour balance, black level, contrast deviate from the expected/preferred values, the digital head transmits signals to the light modulating device to reduce the deviation.

The sensor(s) may e.g. be located behind the photosensitive material. In this case, the transference process must be stopped at regular intervals for image control. Alternatively, a fraction of the light beam may be split off before it reaches the photosensitive material, and this fraction of light is lead onto the sensor. This alternative permits control during transference. The measurements may be done for each frame, for one frame in each scene in the film, or at any desired time. Using this sensor information, the image quality of the projected film may be considerably improved.

Other sensors may also be included in the system and the sensor data fed to the digital head. Examples of such sensor data are film breakage (a sensor detecting the presence of a photosensitive material in the exposing area), film movement speed, length of exposed film, etc. This information may be transferred to the graphic user interface to be displayed to the user of the device.

The transferral to the photosensitive material may be performed using two different methods. In a preferred method, performed using the system described above, the motion pictures are transferred/recorded frame by frame. The transportation of the photosensitive material is intermittent, pausing the movement until a whole frame has been exposed on the photosensitive material. The time period for pausing the movement may be a predetermined time period, or the transport of the photosensitive medium continues when the sensor values satisfies reference values. The alternative method uses continuous movement of the photosensitive material, and records the motion pictures line by line by projecting one whole line at a time. To perform this method the light modulating device must be of a linear type, preferably a linear version of the above-mentioned kinds of modulators.

FIG. 1 gives an overview of a device for transferring full frame digital and/or analogue motion pictures comprising a series of frames, to a photosensitive material. The digital head 10 plays a central role in the device, receiving, processing and transmitting signals to/from the other components in the device. The digital head 10 additionally comprises essential optical components, which will be explained later in connection with FIGS. 2 and 3. The digital head 10 is connected to the graphical computer interface 11 via a signal cable 20, for example a serial line, a Serial Digital Interface (SDI) or Digital Visual Interface (DVI). The motion picture image data is transferred from the graphical computer interface 11 to the digital head 10 and processed there. The data processing results in a set of instructions to the imaging optics of the digital head and instructions to a film transport control 13 and shutter 22. The optics of the digital head 10 transforms the processed image data to modulated light representing the image to be recorded on the photosensitive material 26. The photosensitive material is in one embodiment celluloid film.

A projection lens 17 is also included in the optical head. The projection lens 17 projects the light representing the image onto the film to expose the area of the film where the light projects the picture. The projection lens 17 is preferably a high-quality lens with excellent optical properties, such as small aberrations, small reflections in the visible wavelength spectrum, uniform colour and brightness, etc.

A shutter 22 controls the amount of light reaching the film. The shutter is in one embodiment a mechanical shutter, but may in another embodiment be a LCD shutter. The time period of the open shutter 22 determines the amount of light exposing the film. The opening-closing operation of the shutter 22 is controlled from the digital head 10, by open/close-signals transmitted on the electronic connection 24.

A transport system 14 for the film is provided near the digital head exit and the shutter 22. The film 9 is wound on at least two roller devices 15a, 15b; one supply device 15a for providing the device with unexposed film and one temporary store device 15b for winding the exposed film until the desired amount of pictures are recorded. The roller devices are preferably covered by a light tight housing. The roller devices 15a, 15b are rotated by motor devices, for instance servo motors. The roller devices 15a, 15b are separated to release an amount of the film for exposure. Between the two roller devices 15a, 15b, the transport system 14 comprises film guide locks 16 for controlling the path of the film between the roller devices 15a, 15b. The transport system 14 further comprises a film aperture gate for allowing light to reach the film on a defined section of the film.

Adjacent to the film aperture gate, there are provided at least one image sensor 23. The image sensor(s) 23 detects the recorded image quality and transmits sensor information to the digital head 10. The image sensor(s) 23 may for example detect the brightness, the colour balance, the colour saturation and/or the contrast of the image. The sensor values for each property are compared to reference values stored in the digital head. If the difference is greater than a predetermined threshold value, the digital head sends corrected instructions to the imaging optics to achieve better recording performance.

The information from the image sensor(s) may also be used for controlling the shutter 22. When the sensor values corresponding to exposure times differ from the desired values, the digital head extends or reduces the shutter's open time period.

A film transport control 13 controls the advance of the film in the transport system 14 by controlling the motors of the roller devices 15a, 15b. The film transport control receives synchronisation information from the digital head and rotates the roller devices according to this. The synchronisation information from the digital head may comprise start and stop signals, interval times, film speed, etc, and assures that the correct section of the film is exposed for each picture.

The digital head is also connected to a user interface 12. The user interface 12 displays information regarding the recording progress, such as the amount of film left in the supply device 15a, time left of the recording, the image quality, motion picture references (name, duration, format, etc.), and alarms when errors occur because of broken film or other reasons. This information is based on the sensor information contained in the digital head 10.

For calibration of the finished recorded/exposed film, the film is re-inserted into the device and run through the film path. In this case, the light from the light source (not shown) illuminates the film without being modulated by the light modulation device in the digital head 10, and the image sensor(s) 23 detects the characteristics of the film 9. The results are processed in the digital head and/or other control device which also generates correction signals to the correct device, such as the light source, the light modulation device, the shutter, the film transport device, etc.

Figure 2:
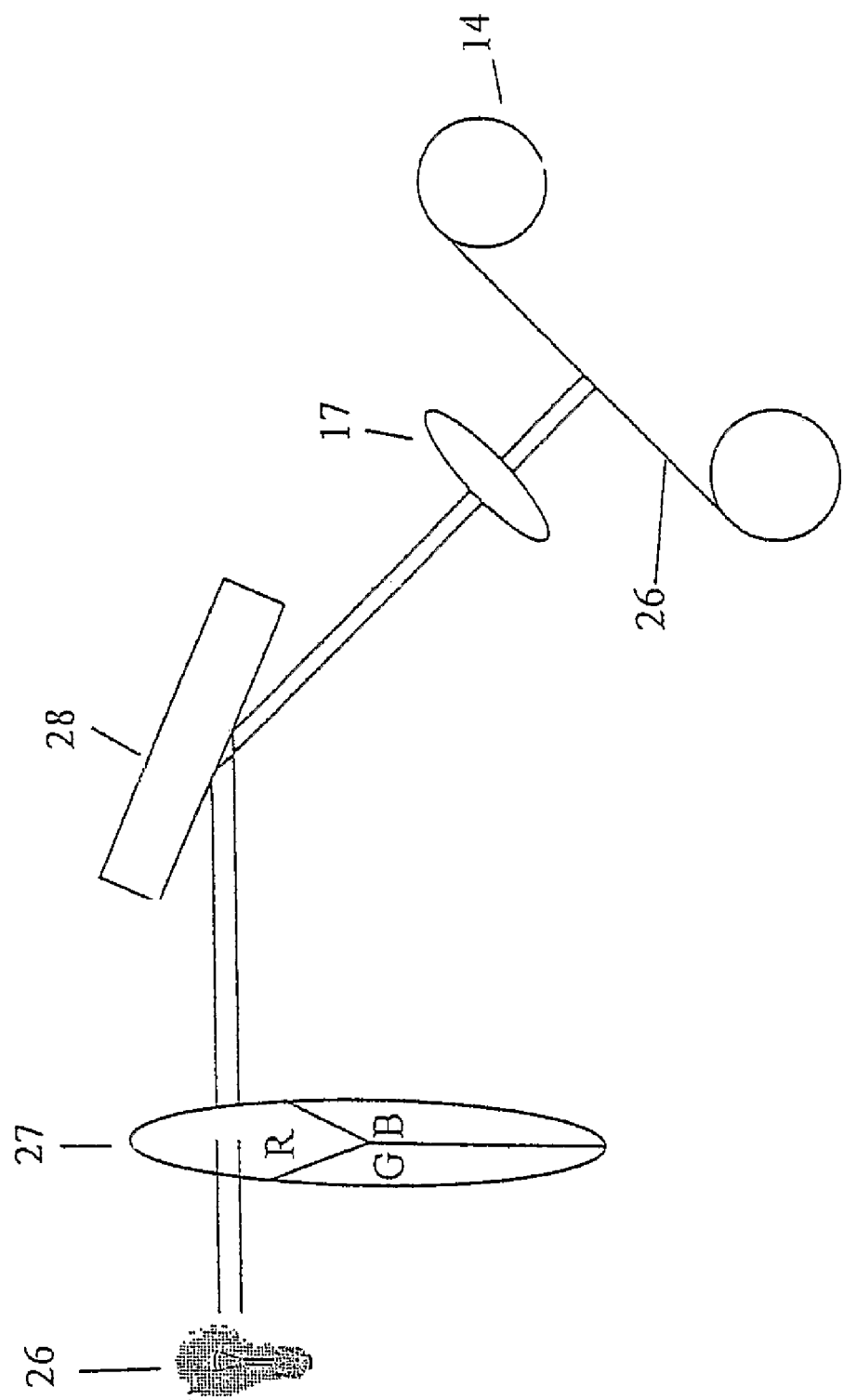
FIG. 2 shows one configuration of the optical path inside the digital head.

FIG. 2 is diagram of one configuration of the optical components of the digital head. A light source 26 emits radiation in the visible wavelength range. The light source may be any light source with the desired wavelength emitting properties, e.g. having good emitting properties in the visible light spectrum, having sufficient brightness to expose the film without too long shutter times, etc. In one embodiment, the light source is a off-the shelf incandescent lamp.

A colour wheel 27 placed in the light path filters out the desired colours sequentially when rotating at a predetermined speed. The coloured light is modulated by one single light modulation device 28 and is transmitted to the projecting lens 17. The projecting lens projects the modulated light onto the film 26.

Figure 3:
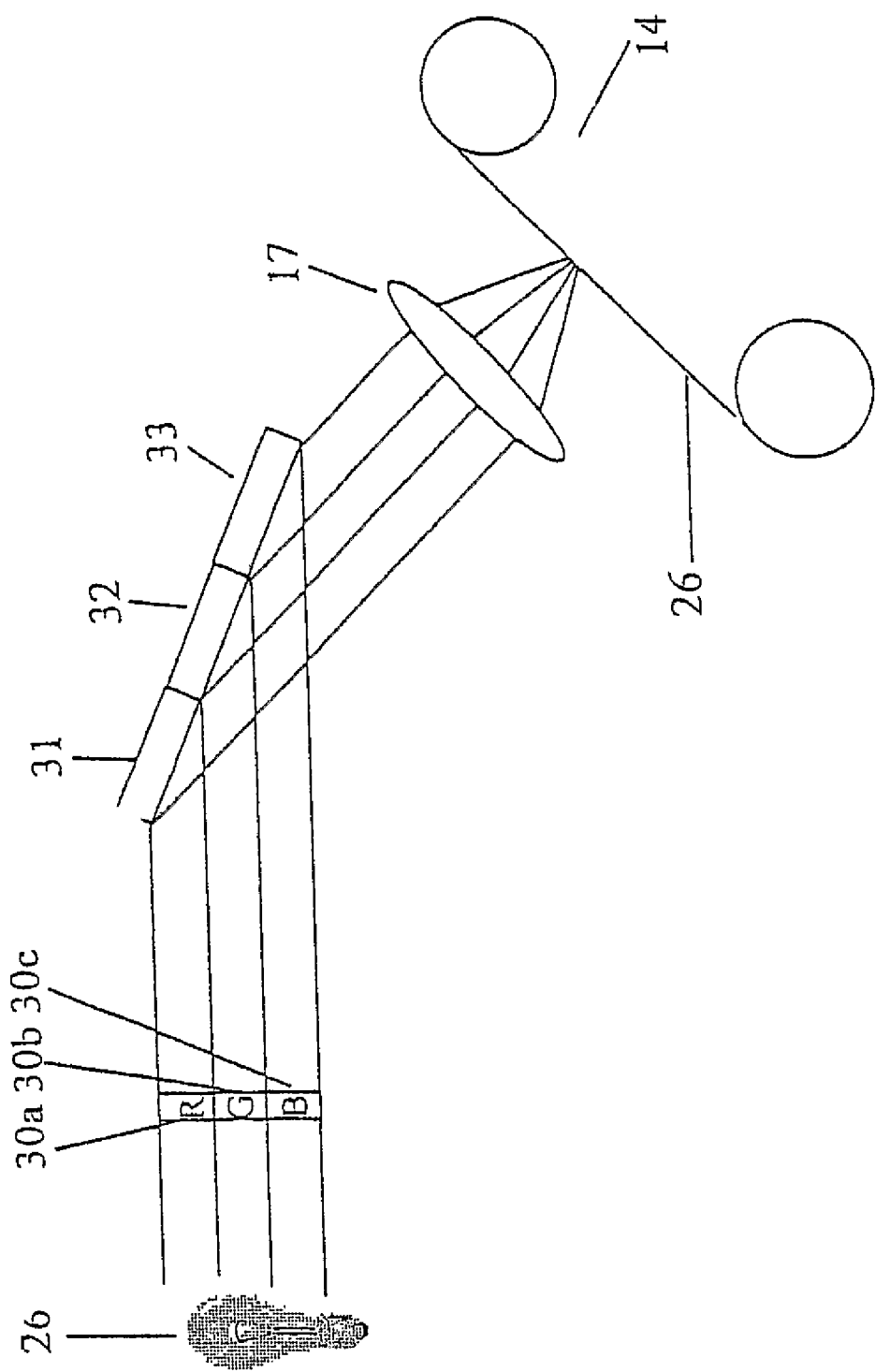
FIG. 3 shows an alternative configuration of the optical path inside the digital head.

FIG. 3 is a diagram of another configuration of the optical components of the digital head. The light source 26 is the same as in FIG. 2, but in this case, the light beam passes through three separate colour filters 30a-c. The three coloured light beams are modulated by three separate light modulation devices 31,32,33, respectively and are collected by the lens 17 to expose the film 26.

Figure 4:
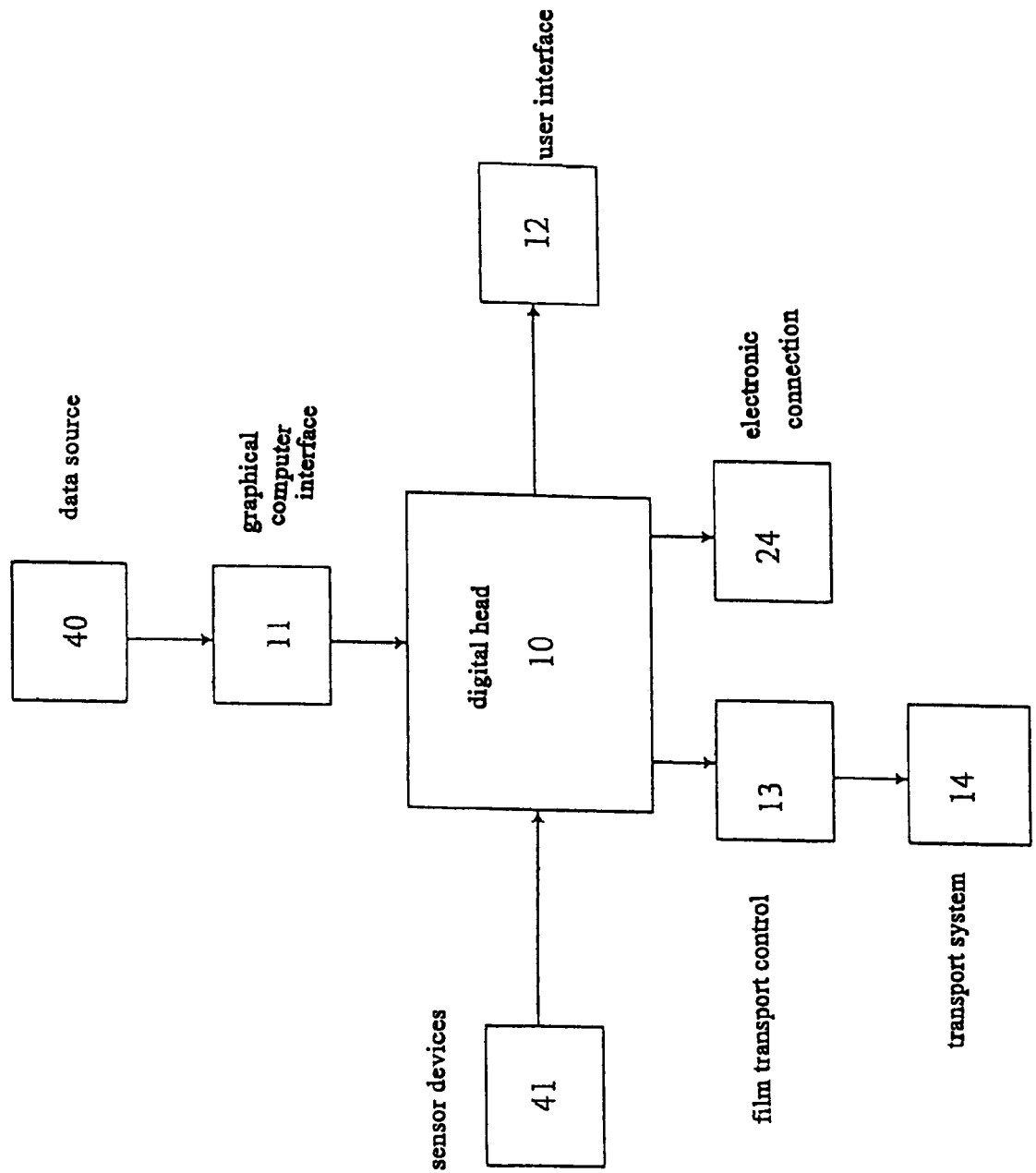
FIG. 4 shows a block diagram illustrating the signal communication in the device according to the invention.

FIG. 4 illustrates the signal communications in the device according to the invention. The digital head 10 plays a central role in controlling the functions of the device. The digital head 10 receives image data from the graphical computer interface 11. The graphical computer interface 11 may be connected to an external data source 40. This may be an external computer, disk drive, or other source of image data. The digital head receives sensor data from sensor devices 41 and use this in processing the image data. At least some of the sensor data are displayed on the user interface 12. The digital head, transmits control signals to the film transportation control 13 and to the shutter, also based on the image data processing and the sensor data. The film transportation control transmits control signals to the film transport system.

The invention claimed is:

1. Method for calibration and/or compensation in transference of digital and/or analogue motion pictures to a photosensitive material, comprising:
    exposing a section of a photosensitive material by modulating light from a light source and imaging the modulated light onto the photosensitive material,
    developing the section of the photosensitive material to form a developed section of the photosensitive material,
    measuring characteristics of the developed section of the photosensitive material while illuminated by said light source, and
    adjusting the light source and/or light modulation according to the measurement.

2. The method according to claim 1, wherein the exposing of the photosensitive material is performed by means of an exposing device which comprises a light source, a light modulation device, a transport device, and a processing device.

3. The method according to claim 1, wherein the exposing of the photosensitive material is performed by means of an exposing device which comprises a light source, a color filter, at least one lens for projecting modulated light onto the photosensitive material, a shutter device and a transport device, a digital head comprising the light source, the color filter, at least one full frame device for light modulation, the at least one lens, processing electronics and software for processing the input image data, and for transport and shutter device synchronization, a user interface, and a graphical computer interface connected to the digital head, and wherein the transport device is adapted for exposing, section for section, sections of the photosensitive material corresponding to each of the motion picture frames, to the modulated projected light, in such a way that the number of frames per time unit in the original motion picture corresponds to the number of projected frames per time unit.

4. The method according to claim 2 or 3, wherein the developed section of the photosensitive material is inserted into the exposing device and the exposing device comprises sensors for measuring the characteristics of the developed section of the photosensitive material.

5. The method according to claim 1, wherein the adjustment of the light source or the light modulation is performed if the difference between the measured characteristics and the desired characteristics exceeds a threshold value.

6. The method according to claim 4 wherein the measurement from the sensors also provide signals indicating status for the exposing device.

* * * * *